United States Patent [19]

Yokoyama

[11] Patent Number: 5,034,835
[45] Date of Patent: Jul. 23, 1991

[54] DISK DRIVE HAVING AIR FILTRATION SYSTEM

[75] Inventor: Tadashi Yokoyama, Amagasaki, Japan

[73] Assignee: Mitsubishi Denki Kabushiki Kaisha, Tokyo, Japan

[21] Appl. No.: 480,750

[22] Filed: Feb. 16, 1990

[30] Foreign Application Priority Data

Apr. 20, 1989 [JP] Japan .................................. 1-102205

[51] Int. Cl.⁵ ............................................. G11B 33/14
[52] U.S. Cl. .................................................. 360/97.02
[58] Field of Search ........................... 360/97.02, 97.03

[56] References Cited

U.S. PATENT DOCUMENTS

| 3,912,278 | 10/1975 | Teutsch | 360/97.02 |
| 4,594,626 | 6/1986 | Frangesh | 360/97.02 |
| 4,710,830 | 12/1987 | Inai et al. | 360/97.03 |
| 4,888,655 | 12/1989 | Bonn | 360/97.03 |

FOREIGN PATENT DOCUMENTS 0198485 9/1986 Japan .
0211185 9/1988 Japan .
0211186 9/1988 Japan .

OTHER PUBLICATIONS

Japuntich, "Disk Drive Recirculation Filtration System Evaluation", Microcontaimination, Jan. 1985, pp. 52-56.

Primary Examiner—David J. Severin
Attorney, Agent, or Firm—Wolf, Greenfield & Sacks

[57] ABSTRACT

A disk drive which removably holds a filter member for air filtration system by an elastic member being fixed in a casing housing a disk-type data recording medium, so that its constitution can be simplified and process of assembling and mounting it in the sealed casing can be minimized.

22 Claims, 6 Drawing Sheets

DISK DRIVE HAVING AIR FILTRATION SYSTEM

BACKGROUND OF THE INVENTION

1. Field of the Invention

The present invention relates to a disk drive being used mainly as an auxiliary storage of a computer system for driving such as a magnetic disk, an optical disk, or a magneto-optic disk, and more particularly, to a disk drive having an air filtration system comprising a filter fixed in a casing thereof.

2. Description of Related Art

For an auxiliary storage of computer system, there has generally been used a disk drive to drive such data medium as a magnetic disk, an optical disk, or a magneto-optic disk. In such a disk drive, a disk, as data medium, has been housed in a sealed casing. A recording/reading head which records data on the disk or reads it from the disk floats with a gap of sub-micron order from the surface of the disk by air flow pressure caused by rotation of the disk. Upon rotation, when any dust exists around the head, there is the possibility that the dust entering in between the head and the disk interferes with the stable floating of the head or damages the head and/or the disk itself.

Dust is produced by contact between of the disk and the head, or friction of a bearing of a motor for rotating the disk.

Because of these circumstances, many disk drives are provided with an air filtration system for removing dust having entered therein.

Figure 1:
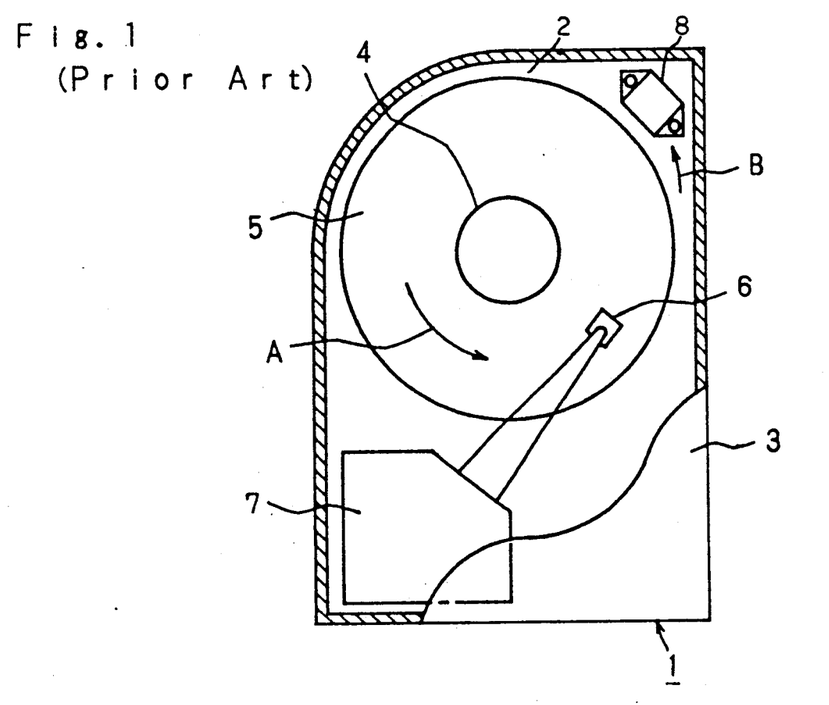
FIG. 1 is a partially fragmentary plan view for showing the internal construction of a conventional disk drive having an air filtration system.
Figure 2:
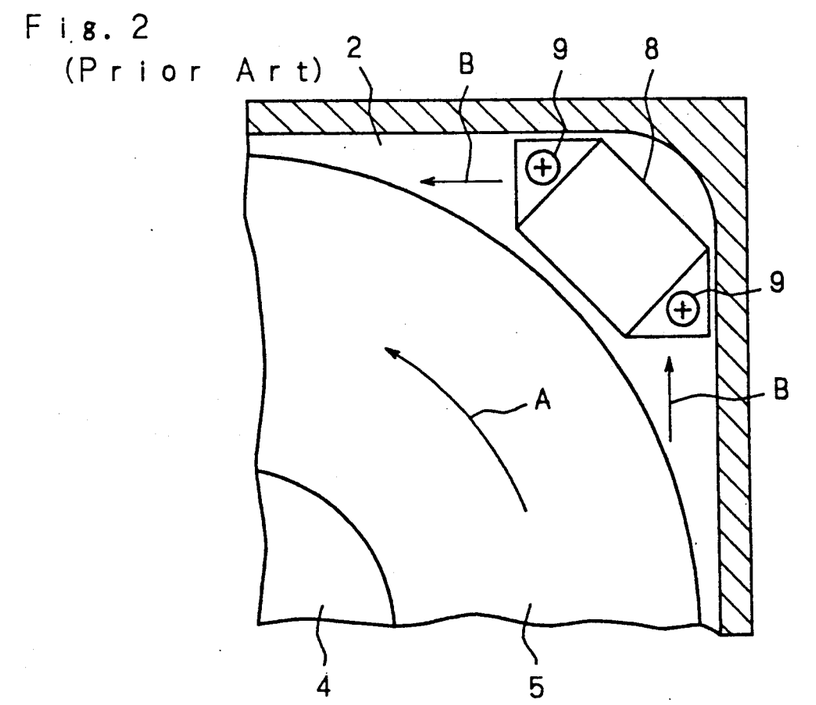
FIG. 2 is an enlarged view of a portion in which a filter is fixed to a base thereof.
Figure 3:
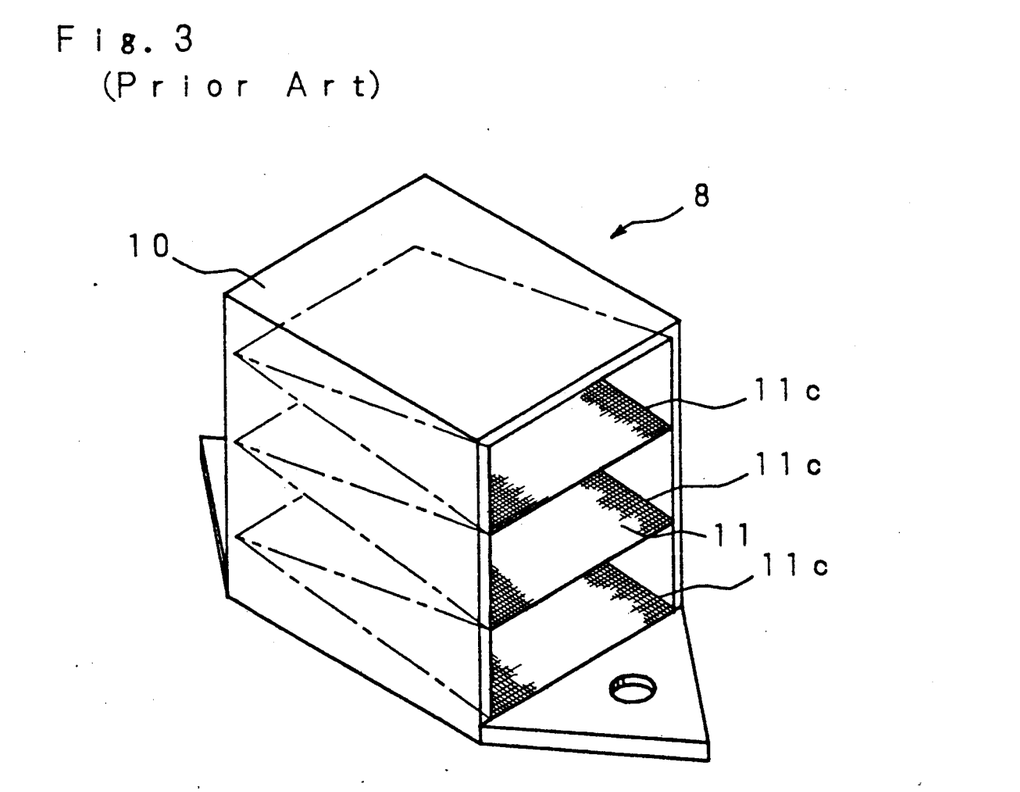
FIG. 3 is a perspective view showing an embodiment of the filter.

FIG. 1 through FIG. 3 show an embodiment of a conventional disk drive having such an air filtration system.

FIG. 1 is a partially fragmentary plan view illustrating the internal construction of the conventional disk drive.

Reference numeral 1 designates a sealed casing, which is comprised of a base 2 and a cover 3. In addition, the cover 3 is shown to be in its fragmentary state in FIG. 1.

There are fixed to the base 2 a spindle motor (not shown) whose rotary shaft is mounted to a rotahub 4, an actuator 7 for moving a head 6, and a filter 8.

Plural disks 5 are fixed to the rotahub 4 and rotate in the direction of an arrow A.

The head 6 moves promptly to a predetermined position in the radial direction of the disks 5 by the actuator 7.

The filter 8 is fixedly mounted to one corner of the base 2.

FIG. 2 is an enlarged view of the corner of the base 2 in which the filter 8 is mounted.

The filter 8 is fixedly mounted to the corner of the base 2 with fixing screws 9.

FIG. 3 is a perspective view showing an embodiment of the filter 8.

The filter 8 is comprised of a cylindrical holder 10 with quadrilateral sections and a filter member 11 being mounted in the holder 10. The filter member 11 made of fabrics is bent zigzag, and has side peripheries 11c that are glued to the inner surface of the casing 10 so that edges of the bent portions of the filter member 11 can face an opening of the holder 10.

One of the reason why the side peripheries 11c of the filter member 11 are glued to the inner surface of the holder 10 is that any of the side peripheries 11c is cut and frayed to produce waste threads, which is prevented from resulting in dust.

Functional operation of writing/reading of data on the disk 5 by such conventional disk drive as aforementioned is known so well that it is omitted here.

When the disk 5 rotates at high speed in the direction of the arrow A, air flow is generated around it. Part of the air flow shown by an arrow B flows into the opening of the holder 10 of filter 8 and dust being included in the air flow is caught by the filter member 11.

When the filter 8 is assembled, it is necessary to provide a process wherein the side peripheries 11c of the filter member 11 are glued to the inner surface of the holder 10 with adhesive bond. In addition, the fixing screws 9 are needed to fix the filter 8 to the base 2. As has been seen above, assembling the filter 8 and mounting it to the base 2 have required relatively more process steps, which result in a disadvantage of taking more time.

SUMMARY OF THE INVENTION

The foregoing disadvantage is overcome in accordance with the present invention, and it is an object of the invention to provide a disk drive whose air filtration system is simplified and whose filter can be assembled and fixed easily with high accuracy.

In the disk drive of the invention, a filter member for air filtration system is removably held by an elastic member being fixed in a sealed casing which houses a disk-type data recording medium therein. This arrangement can realize both simplification of air filtration system and minimization of such process steps of assembling the filter and fixing it to the sealed casing so as to reduce time necessary for them.

The above and further objects and features of the invention will more fully be apparent from the following detailed description with accompanying drawings.

DESCRIPTION OF THE PREFERRED EMBODIMENTS

Now, preferred embodiments of the present invention will be described in detail with reference to the drawings.

FIG. 4 through FIGS. 7 are drawings showing a first embodiment of the disk drive of the present invention.

Figure 4:
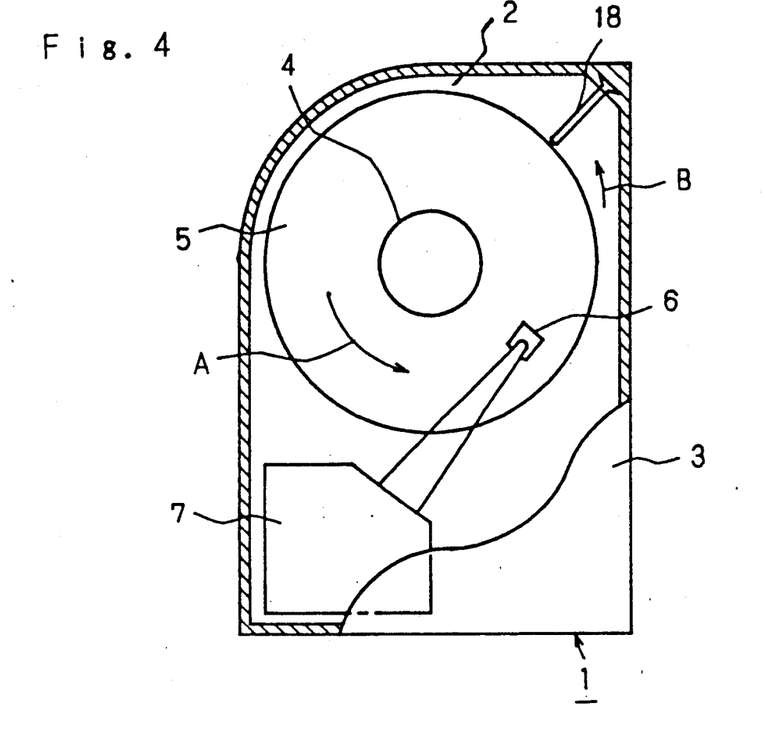
FIG. 4 is a partially fragmentary plan view for showing the internal construction of a first embodiment of the disk drive of the present invention.

FIG. 4 is a partially fragmentary plan view showing the internal construction of the first embodiment of the disk drive of the present invention.

Reference numeral 1 designates a sealed casing which is comprised of a base 2 and a cover 3.

In the base 2, there is fixedly mounted a spindle motor (not shown) whose rotary shaft is mounted to a rotahub 4, an actuator 7 for moving a head 6, a filter 18, and the like.

A disk 5 is fixed to the rotahub 4, rotating in the direction of an arrow A.

The head 6 moves promptly to a predetermined position in the radial direction of the disk 5 by the actuator 7.

The filter 18 is fixed to a corner of the base 2.

Figure 5:
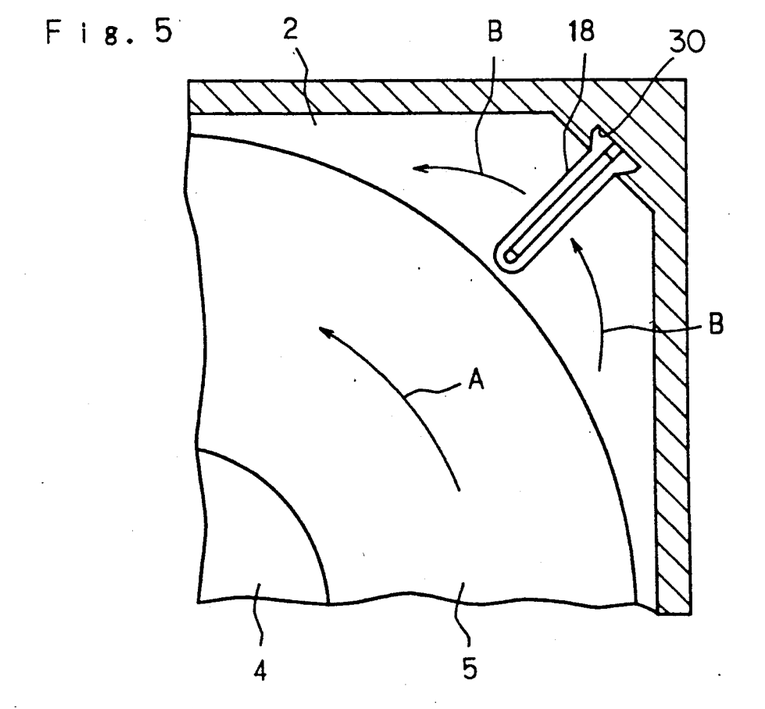
FIG. 5 is an enlarged view of a portion in which a filter is fixed to a base thereof.
Figure 6:
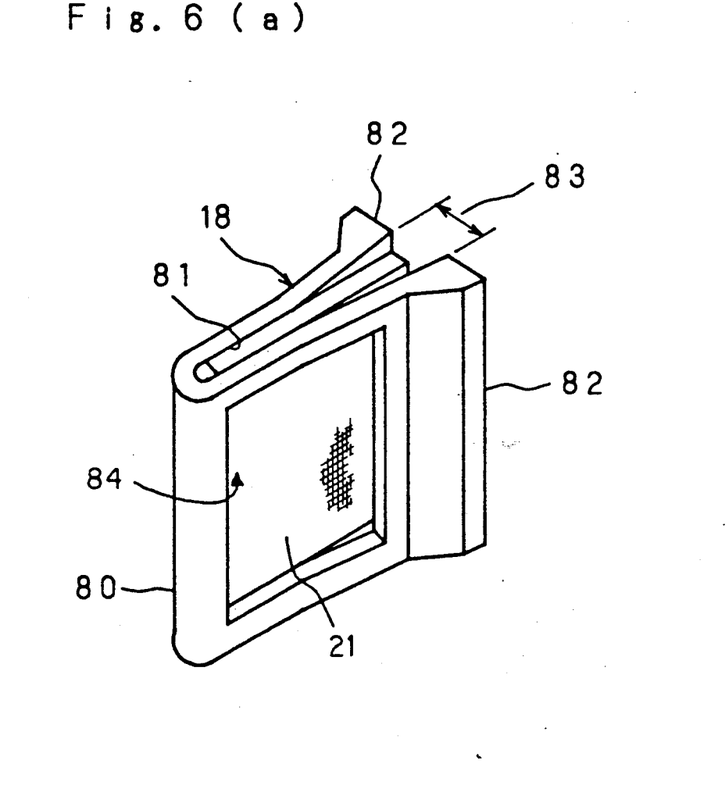
FIGS. 6(a) and 6(b) are perspective views showing an embodiment of the filter.

FIG. 5 is an enlarged view of the portion of the base 2 in which the filter 18 is fixed thereto.

The filter 18 is mounted to an engaging channel 30 (FIG. 7) provided at a corner of the cover 3.

FIGS. 6(a) and 6(b) are perspective views showing an embodiment of the filter 18.

The filter 18 being used in the air filtration system of the disk drive in the first embodiment of the present invention, as shown in FIG. 6(a), is comprised of a filter member 21 and a holder 80 to hold the filter member 21.

The holder 80 made of elastic synthetic resin is formed in like a U-letter whose opening side is slightly widely opened on a plan view of it and whose inner side portion has a slit 81 in which the filter member 21 is inserted. The width of closed portion of the slit 81 of the holder 80 is adapted to be slightly smaller than the thickness of peripheral portions 21a of the filter member 21. Accordingly, when the peripheral portions 21a of the filter member 21 are inserted into the slit 81 of the holder 80, it is elastically held by being nipped in the closed portion of the slit 81.

An opening 84 is provided in the lateral side of the holder 80 so that the filter member 21 can be exposed when the filter member 21 is inserted into the slit 81 so as to be held in the holder 80. In addition, engaging portions 82 are formed in such a state that ends of the open side of the holder 80 project toward the opposite side of the slit 81.

The filter member 21, in this embodiment, is made of fabrics of synthetic fiber on which an electrification member is applied. As shown in FIG. 6(b), the peripheral portions 21a of the filter member 21 is pressed by heat to be in the form of a frame lest they get frayed to produce waste rags causing dust. When such an electrostatic filter member as described above is employed, the filter 18 with superior capacity of collecting dust and lower resistance of filtration is realized.

In addition, the width of the opening of the slit 81, that is, interval 83 between the engaging portions 82 is adapted to be slightly wider than the thickness of the peripheral portions 21a of the filter member 11. This is so that the filter member 21 can easily be inserted into the holder 80 and so that the engaging portions 82 of the holder 80 can elastically be deformed (closed) when they are brought into engagement with the engaging channels 30 provided in the corner of the cover 3 (See FIG. 7) as will be described later.

Figure 7:
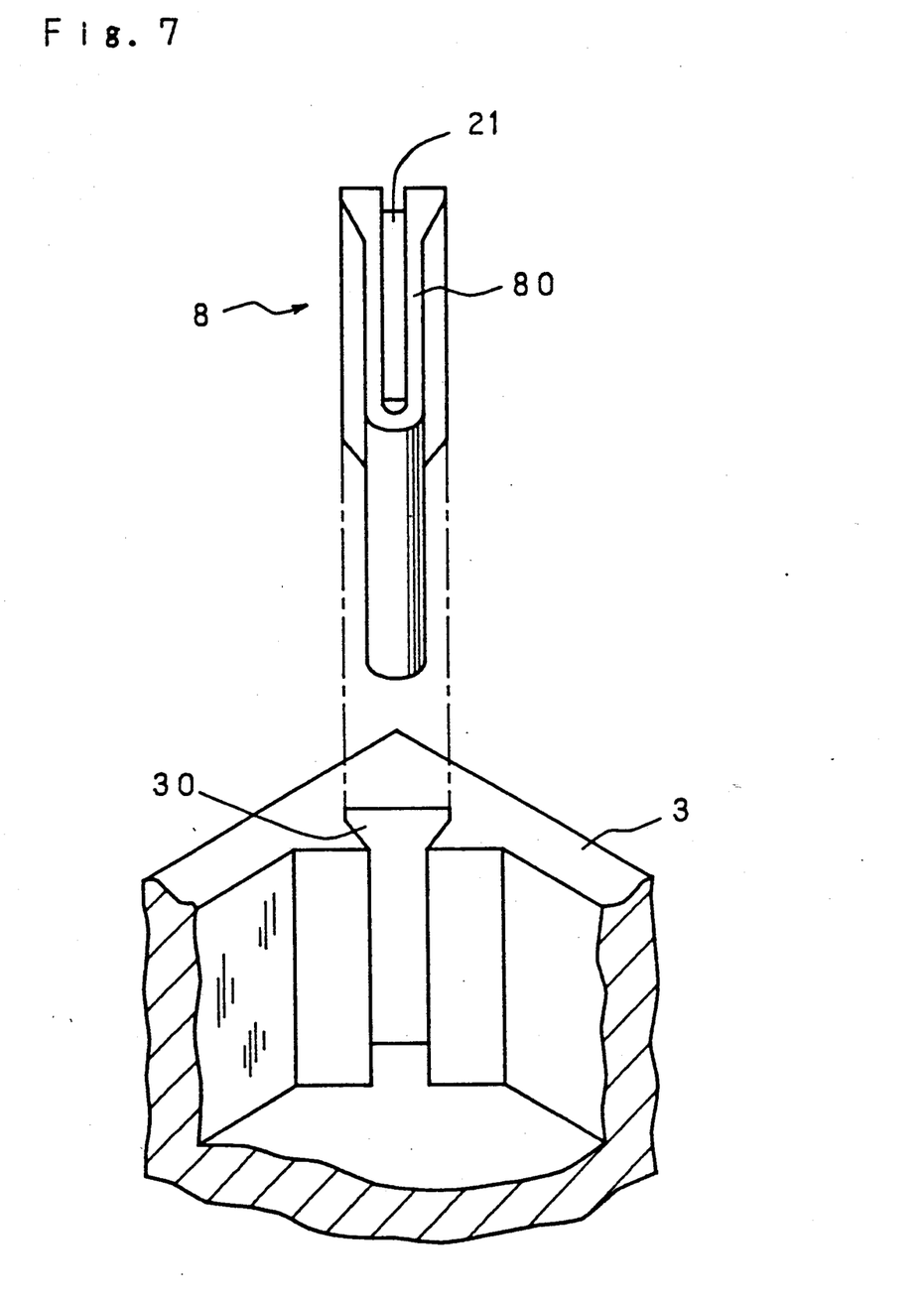
FIG. 7 is a perspective view illustrating a corner of a cover to show a fixing state of the filter thereto.

FIG. 7 is a perspective view illustrating the corner of the cover 3 illustrating how the filter 18 is secured thereto. In addition, FIG. 7 shows the cover 3 turned over.

The engaging channel 30 for fixing the filter 8 thereto is provided in the corner of the cover 3. The engaging channel 30 is formed to have such a configuration and size so that the open side of the holder 80 (portions 82) can be inserted into the channel 30 to be elastically deformed so as to close interval 83 between the engaging portions 82.

In such a disk drive of the present invention as described above, its functional operation of writing/reading data on the disk 5 having been well-known, it is omitted here.

When mounting the filter 18, it is inserted into the engaging channel 30 of the cover 3 in the state that the engaging portions 82 of the holder 80 are pressed, against its elasticity, to narrow the interval 83 between them. Once the filter 18 is inserted into the engaging channel 30, the engaging portions 82 of the holder 80 are pressed against the inner surface of the engaging channel 30 because they tend to restore their elasticity therein, thereby, the holder 80 is fixed to the cover 3.

In addition, the filter member 21 is held in the slit 81 of the holder 80. The holder 80 is held in the cover 3 in the state that the interval 83 of the opening thereof is narrowed. Thus, the filter member 21 is held by being nipped with elasticity of the holder 80.

In such the disk drive as described above, when the disk 5 rotates at high-speed in the direction of the arrow A, air flow is generated around it. Part of the air flow shown with the arrow B flows into the filter 18 and dust included therein is caught by the filter member 21.

Figure 8:
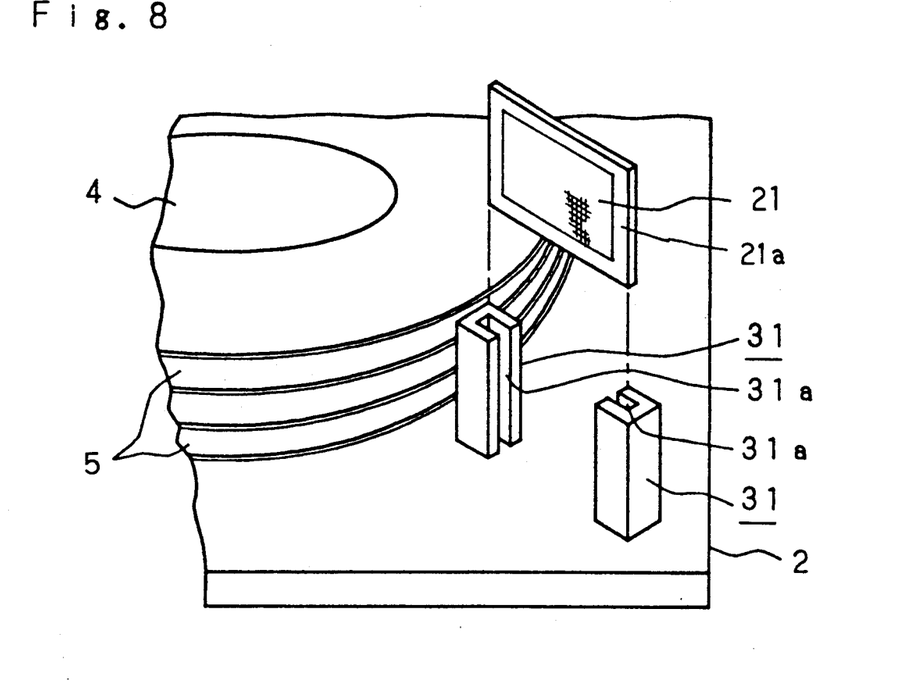
FIG. 8 is a perspective view showing a second embodiment of the disk drive of the present invention.

FIG. 8 is a perspective view illustrating a second embodiment of the disk drive of the present invention. The figure illustrates the apparatus with the cover 3 removed.

Channel members made of elastic rubber designated by reference numeral 31 are fixed vertically onto the base 2 so that both channels 31a of the channel members 31 can be positioned opposite to each other. The width of each of the channels 31a is adapted to be formed slightly smaller than the thickness of the peripheral portions 21a of the filter member 21. The interval between both bottoms of the channels 31a of the channel members 31 is adapted to be slightly longer than the length of the filter member 21.

In the second embodiment, the peripheral portions 21a of the filter member 21 are inserted into the respective channels 31a from the upper side of the both channel members 31. And at that time, the peripheral portions 21a of the filter member 21 are inserted into the channels 31a while they extend the channels 31a of the channel members 31 in the direction of their width, in other words, elastically deforming (opening) the channels 31a.

Accordingly, the peripheral portions 21a of the filter member 21 are held by the channels 31a of the both channel members 31 with elasticity of the channels 31a.

Figure 9:
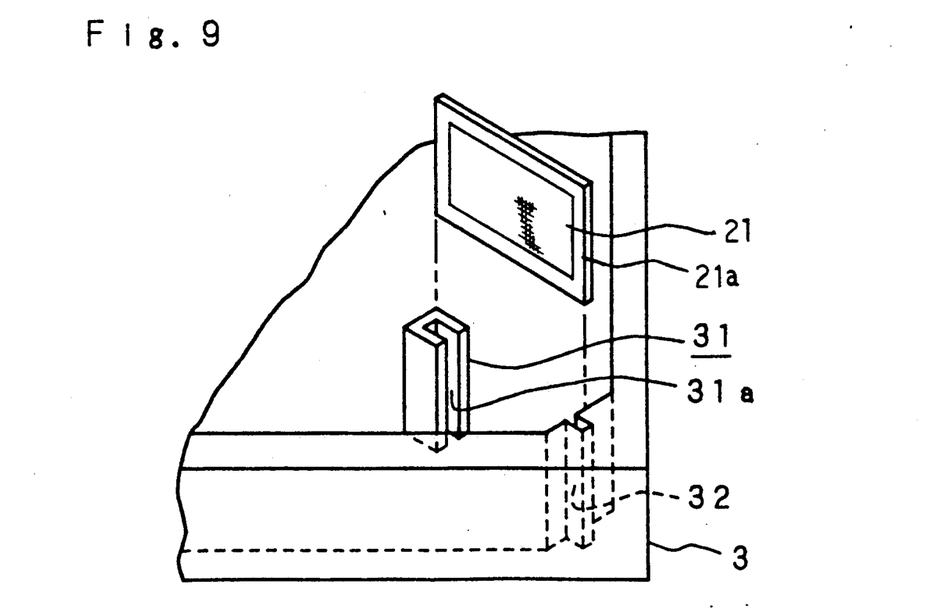
FIG. 9 is a perspective view showing a third embodiment of the disk drive of the present invention.

FIG. 9 is a perspective view showing a third embodiment of the disk drive of the present invention. The figure illustrates the cover 3 being turned over.

Reference numeral 32 designates a channel provided at the corner of the cover 3, where the longitudinal direction of the channel is formed at a right angle to the base 2. And the width of the channel 32 is formed to be slightly wider than the thickness of the peripheral portions 21a of the filter member 21.

Reference numeral 31 designates the channel member provided with the channel 31a in the same way as in the aforementioned second embodiment. The channel member 31 is vertically fixed to the cover 3 in the state that the channel 31a can be positioned opposite to the channel 32 provided in the cover 3.

In the third embodiment, the peripheral portions 21a of the filter member 11 are inserted in between the channel 31a of the channel member 31 and the channel 32 provided at the cover 3 from the upper part of the channels 31 and 32 as shown in FIG. 9. And at that time, one of the peripheral portions 21a of the filter member is guided into the channel 32 provided at the corner of the cover 3, and the other is inserted into the channel 31a while extending the channel 31a against elasticity of the channel member 31 so that it can be elastically supported by the channel 31a.

In that case, because one of the peripheral portions 21a of the filter member 21 alone extends the channel 31a of the channel member 31, about half as much force as that in the aforementioned second embodiment is required so as to insert the filter member 21 into the channel 31a.

In addition, it may be possible, also in the second embodiment, to make the width of one of channels 31a of the channel members 31 wider than the thickness of the peripheral portion 21a of the filter member 21. Consequently, in the second embodiment, since one of the peripheral portions 21a of the filter member 21 alone extends the channel 31a of the channel member 31, about half as much force is required so as to insert the filter member 21 in the same way as in the third embodiment.

As can be seen above, the casing 1 is produced by combining the base 2 with the cover 3 in which the filter member 21 is mounted.

In the first embodiment shown in FIGS. 6a and 6b, the holder 80 is formed to be a configuration having elasticity. An elastic member, such as rubber, is employed for the material of the holder 80 so that it can hold by nipping the filter member 21 and can engage elastically with the engaging channel 30 of the cover 3. In addition to it, the holder 80 may be made of steel sheets with folding process applied thereto.

In addition, the arrangements, in the second and third embodiments shown in FIG. 8 and FIG. 9 respectively, may be possible to be replaced with the channel member 31 made of a material with high rigidity, such as metal. The width of the channel 31a is made to be slightly wider than the thickness of the peripheral portion 21a of the filter member 21, and the peripheral portion 21a of the filter member 21 coated with an elastic member such as rubber is inserted into the channel 32.

In the above each embodiment, the filter member 21 is made of fabrics and the peripheral portions 21a are pressed and glued by applying heat thereto, however, it may be possible that the filter member 21 is made of cloth of unwoven texture, paper, or the like and that the peripheral portions 21a are glued with such as epoxy resin, or a frame of the peripheral portions 21a is reinforced with a material of high rigidity.

As have been described above, in the disk drive of the present invention, because the filter member is removably provided in the casing through an elastic member, constitution of the filter can be simplified and it becomes so easy to assemble the filter and to fix it to the casing that their operation time can be reduced.

In addition, because the filter is fixed into the casing through an elastic member, displacement of position of the filter is not liable to be occurred by vibration and the like.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An air filtration system for collecting dust in a sealed casing which houses a rotating disk-type data recording medium, said system comprising:
   an elastic holding member;
   a substantially planar filter member;
   said sealed casing having means for supporting said elastic member peripherally adjacent the outer edge of said disk-type medium so that the plane of said filter member extends substantially in a direction of the radius of said disk-type medium, and further extends with the plane of said filter member disposed substantially orthogonal to the plane of the disk-type medium.

2. A disk drive as set forth in claim 1, wherein
   said elastic member is provided with a slit in which said filter member is inserted and engaging portions projecting outwardly at an opening end of said slit, and
   said sealed casing is provided with engaging channel with which said engaging portions are engaged so as to narrow said slit,
   whereby said filter member is held by being nipped by its elasticity in a case where said filter member is engaged with said engaging channel.

3. A disk drive as set forth in claim 1, wherein said filter member is made of a static electricity adsorption material.

4. A disk drive as set forth in claim 1, wherein said elastic member is constituted by two channel members being positioned opposite to each other, and said filter member is held in between channels of the both channel members.

5. A disk drive as set forth in claim 4, wherein the width of one channel of one channel member of said two channel members is formed to be smaller than the thickness of said filter member.

6. A disk drive as set forth in claim 4, wherein the width of each channel of said two channel members is formed to be smaller than the thickness of said filter member.

7. A disk drive as set forth in claim 1, wherein said elastic member is constituted by one channel member, and said filter member is held in between both a channel being provided in said sealed casing and a channel of said channel member.

8. A disk drive as set forth in claim 7, wherein the width of a channel of either of said channel members is formed to be smaller than the thickness of said filter member.

9. A disk drive as set forth in claim 7, wherein the width of each channel of said both channel members is formed to be smaller than the thickness of said filter member.

10. An air filtration apparatus for collecting dust in a sealed casing of a disk drive apparatus which houses a rotating disk-type data recording medium, said air filtration apparatus comprising, a filter member, a holder for removably receiving and retaining said filter member, said holder comprising an elastically deformable member having opposed surfaces, said holder assuming a first position in which said opposed surfaces are separated to receive said filter member therebetween and a second position in which said opposed surfaces are disposed in close proximity to each other so as to nip and maintain said filter member therebetween, and means for slidably receiving said holder in said sealed casing adjacent said disk-type data recording medium and for maintaining said holder in said second position.

11. An air filtration apparatus as set forth in claim 10 wherein said filter member comprises a substantially planar filter piece having a supporting peripheral portion, said peripheral portion adapted for retained support between said opposed surfaces.

12. An air filtration apparatus as set forth in claim 10 wherein said filter member is constructed of a static electricity adsorption material.

13. An air filtration apparatus as set forth in claim 10 wherein said means for slidably receiving said holder supports said holder peripherally adjacent the outer edge of the disk-type medium so that the plane of said filter member extends substantially in a direction of the radius of said disk-type medium, and further extends with the plane of said filter member disposed substantially orthogonal to the plane of the disk-type medium.

14. An air filtration apparatus as set forth in claim 10 wherein said elastically deformable member comprises two channel members positioned opposite to each other, said filter member being held therebetween in respective channels of said channel members.

15. An air filtration apparatus as set forth in claim 14 wherein the width of one channel member of said two channel members is formed to be smaller than the thickness of said filter member.

16. An air filtration apparatus as set forth in claim 14 wherein the width of each channel of said two channel members is formed to be smaller than the thickness of said filter member.

17. An air filtration apparatus as set forth in claim 10 wherein said holder comprises one channel member and means defining a channel in said sealed casing, said filter member being held between said channel member and the channel in said sealed casing.

18. An air filtration apparatus as set forth in claim 17 wherein the width of the channel of either said channel member of said channel in the sealed casing is formed to be smaller than the thickness of said filter member.

19. An air filtration apparatus as set forth in claim 17 wherein the width of each channel of both the channel member and the channel defined in the sealed casing is formed to be smaller than the thickness of said filter member.

20. An air filtration apparatus for collecting dust in a sealed casing of a disk drive apparatus which houses a rotating disk-type data recording medium, said air filtration apparatus comprising, a filter member, a holder for removably receiving and retaining said filter member, said holder comprising an elasticly deformable member having opposed surfaces between which said filter member is nipped, and means for fixing said holder in said sealed casing adjacent said disk-type data recording medium, said elastically deformable member has means defining a slit in which said filter member is inserted and furthermore including engaging portions projecting outwardly at an open end of said slit, said sealed casing being provided with engaging channel means within which said engaging portions are engaged so as to narrow said slit, whereby said filter member is held by being nipped by said elastically deformable member when the member is engaged with said engaging channel.

21. An air filtration apparatus for collecting dust in a sealed casing of a disk drive apparatus which houses a rotating disk-type data recording medium, said air filtration apparatus comprising, a substantially planar filter member, a holder for removably receiving and retaining said filter member, said holder comprising an elastically deformable member having opposed surfaces between which said filter member is nipped, said sealed casing having means for supporting said holder peripherally adjacent the outer edge of said disk-type medium so that the plane of said filter member extends substantially in a direction of the radius of said disk-type medium, and further extends with the plane of said filter member disposed substantially orthogonal to the plane of said disk-type medium.

22. An air filtration apparatus for collecting dust in a sealed casing of a disk drive apparatus which houses a rotating disk-type data recording medium, said air filtration apparatus comprising, a filter member, a holder for removably receiving and retaining said filter member, said holder comprising an elastically deformable member having opposed surfaces between which said filter member is nipped, and means for slidably receiving said holder member in said sealed casing adjacent said disk-type data recording medium and for maintaining said holder in a closed configuration so that said opposed surfaces nip said filter member therebetween.

* * * * *